No. 787,338. PATENTED APR. 11, 1905.
G. A. LUTZ.
ROSETTE OR RECEPTACLE FOR CONDUITS FOR ELECTRIC WIRES.
APPLICATION FILED MAY 23, 1901. RENEWED JUNE 5, 1903.
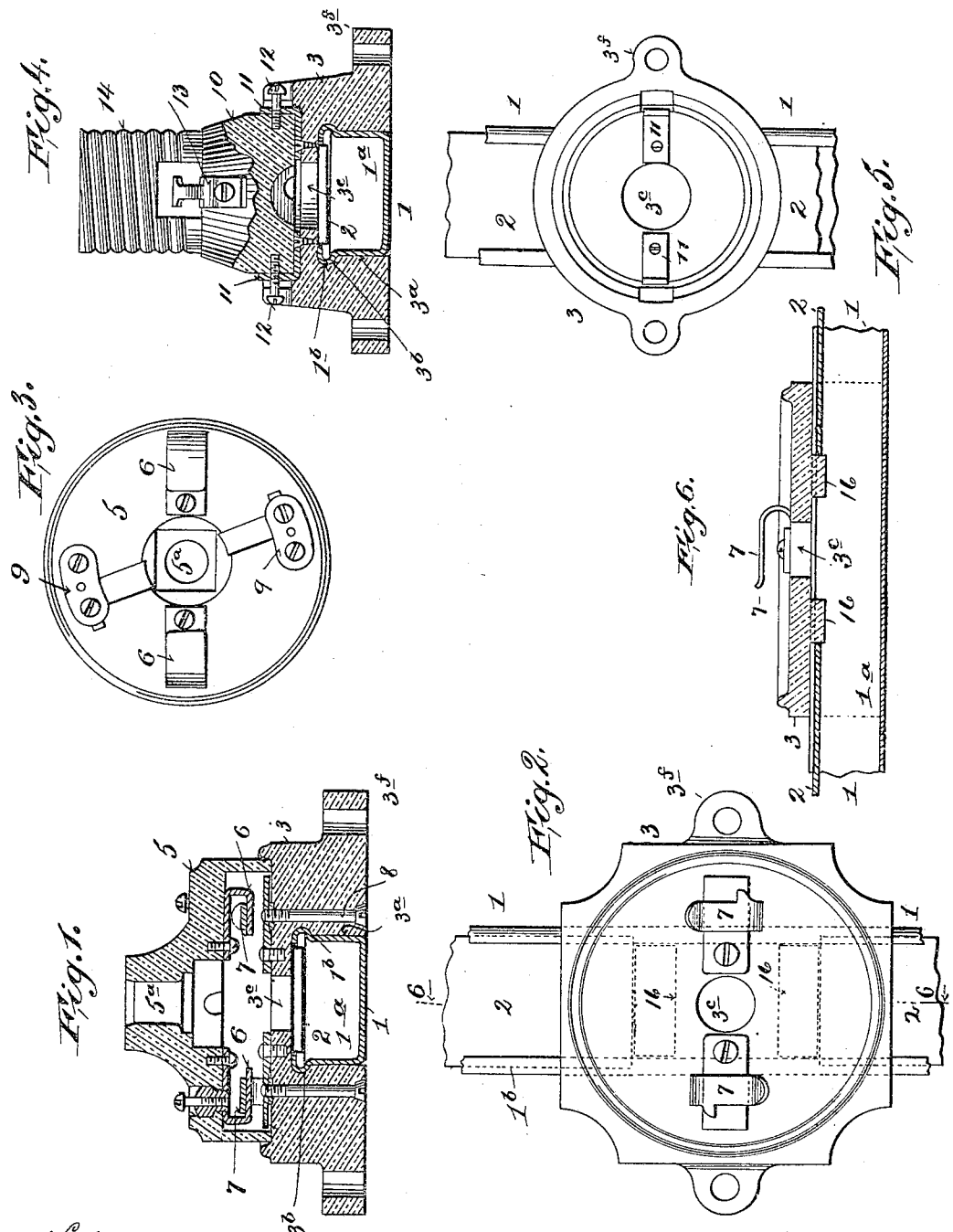

No. 787,338.  
Patented April 11, 1905.

UNITED STATES PATENT OFFICE.

GEORGE A. LUTZ, OF NEW YORK, N. Y., ASSIGNOR, BY MESNE ASSIGN-MENTS, OF ONE-HALF TO FRANK K. BOLAND, OF NEW YORK, N. Y.

ROSETTE OR RECEPTACLE FOR CONDUITS FOR ELECTRIC WIRES.

SPECIFICATION forming part of Letters Patent No. 787,338, dated April 11, 1905.

Application filed May 23, 1901. Renewed June 5, 1903. Serial No. 160,262.

*To all whom it may concern:*

Be it known that I, GEORGE A. LUTZ, a citizen of the United States, and a resident of New York city, borough of Brooklyn, State of New York, have invented certain new and useful Improvements in Rosettes or Receptacles for Conduits for Electric Wires, of which the following is a specification.

My invention relates to improvements in rosettes, receptacles, and analogous fixtures for use in conjunction with conduits for electric wires, and more particularly to the class of conduits that are provided with a channel for the wires and a removable cover for the channels; and the invention consists in the novel details of improvement that will be more fully hereinafter set forth, and then pointed out in the claims.

Reference is to be had to the accompanying drawings, forming part hereof, wherein—

Figure 1 is a central section of a rosette and a conduit to which it is applied in accordance with my invention. Fig. 2 is a plan view, the cap being removed. Fig. 3 is an inverted plan view of the cap. Fig. 4 is a side view, partly in section, of a different form of receptacle applied to the conduit. Fig. 5 is a plan view, the member that carries the contacts being removed; and Fig. 6 is a section on the line 6 6 in Fig. 2.

In the accompanying drawings similar numerals of reference indicate corresponding parts in the several views.

In the drawings the numeral 1 indicates a conduit, which is shown provided with a channel $1^a$ to receive one or more electric wires and having a cover 2 over the channel, the cover being shown held upon the conduit by means of grooves $1^b$, formed at the outer edges of the sides of the conduit, whereby the cover can be slid along the same. The form of conduit I have shown corresponds to that set forth in United States Letters Patent No. 667,567, granted February 5, 1901, to Emmett D. Page, although my invention is not limited to the particular form of conduit shown.

3 indicates the base portion of a rosette, receptacle, cut-out, switch, or the like to be used in conjunction with the conduit, and said base is provided with a transversely-extending groove or opening $3^a$, which leads from side to side of the base through which groove the conduit 1 is adapted to pass, whereby the base 3 may be mounted upon the conduit and may be slid along the same to be fastened in any suitable position. In the drawings I have shown the walls of the groove $3^a$ as provided with countersunk or outwardly-extending portions of the conduit 1, that form the grooves $1^b$ thereof, whereby the base can be suspended from the conduit by the coaction of the walls of the grooves $3^b$ and the metal of the conduit at $1^b$. The base 3 in line with the groove $3^a$ is provided with an opening $3^c$, through which wires from the conduit can be projected. The covers 2 from opposite sides of the base 3 may be brought snug up to the outer side of the base or may be projected under the same, more or less, as indicated in dotted lines in Figs. 2 and 5, to permit the passage of the wires through the opening $3^c$ between the ends of the covers.

To prevent the covers from being pushed so far under the base 3 as to come in contact with the wires that are passed through the opening $3^c$, I provide the base with abutments 16, which project into the groove or channel $3^a$ on opposite sides of the opening $3^c$ of the covers, which abutments lie between the opposed grooves $3^b$ to permit free passage of the conduit. Thus when the covers are pushed under the base they can only pass as far as the abutments, cannot come in contact with the wires extending through opening $3^c$, and short-circuit between the exposed portions of the wire and the covers is prevented.

The base 3 may have applied to it any suitable means for making connections with the wires within the conduit, so as to lead circuits therefrom, and to illustrate the applicability of my invention in connection with such circuit I have shown in Figs. 1, 2, and 3 a rosette of usual type in which 5 is a cap provided with an opening $5^a$ and with contacts 6, adapted to engage contact 7 on the base 3, which latter may be held by screws 8 or in other suitable manner. The cap 5 is also shown provided with the usual contacts 9. In Figs. 1 and 2 the contacts 7 are shown located at opposite sides of the opening 3$^c$ in the base, so that the wires from the conduit can be carried between such contacts. The connections of the wires from the conduit and the leading-out connections will be made with the contacts of the rosette in well-known manner.

In Figs. 4 and 5 I have shown the base 3 as provided with a block 10, secured to the base, as by clips 11, screwed to the base and provided with holes to receive screws 12, that enter the material of the block 10; but other suitable means may be provided for holding the parts 3 and 10 together. The clips 11 are shown at opposite sides of the opening 3$^c$ in the base to permit the passage of wires from the conduit, and the block 10 is provided with contacts 13 and a threaded sleeve 14 to receive an incandescent bulb in suitable or well-known manner.

It will be understood that any other suitable connections for carrying off the lead-out wires from the base 3 may be provided in connection with the latter, as this forms no particular part of my present invention. With my improvements, however, the conduit 1 may be applied to a wall, ceiling, or the like in suitable manner, and when being placed in position one or more bases 3 will be adjusted to the same, as by sliding them along the conduit, so that the corresponding grooves of the base will interlock with the material of the conduit, and the bases 3 can be moved along the conduit and brought into the desired position and there fastened by screws or the like passing through apertured lugs 3$^f$ upon the base or in other suitable manner. The groove 3$^a$ in the base should be so proportioned that the conduit does not project outwardly beyond the bottom of the base to any extent and by preference will be made about flush therewith, as shown in Figs. 1 and 4.

The advantages of my improvements will be apparent when it is considered that in the form of conduit shown the same assists in supporting the base and the connected parts, because the base hangs upon the conduit by the intermeshing grooved portions of the base and conduit, and, further, that butt-joints at the junction of two conduits and the base may be avoided, because the conduit can pass completely through the base, and further protection is afforded because the covers can be slid under the base.

At any time the bases can be moved along the conduit without requiring removal of the conduit from its support, and as the covers can be slid along the conduit a space in line with the opening 3$^c$ of the base can be readily effected between the ends of the covers for pulling the wires through the opening 3$^c$. Of course it will be understood that the ends of two conduits can be projected into corresponding sides of the base 3 instead of having the conduit pass entirely through the same if such construction be found desirable.

Having now described my invention, what I claim is—

1. A rosette for drop-light wires having therein suitable means for making electrical connections, provided with a gain to receive a molding-strip, and in combination therewith, substantially as described.

2. A rosette for drop-light wires having suitable means for electrical connections, provided with side wings and adapted to be secured astride a molding-strip, and in combination therewith, substantially as described.

3. A rosette for drop-light wires, having suitable means for electrical connections, in combination with a molding-strip having electric wires therein, said rosette being attached to and held by said molding-strip, substantially as described.

4. A ceiling-rosette for electric wires, in combination with a molding-strip adapted to rest over the strip and secured thereto, said rosette comprising a base and a cap, substantially as described.

5. A device of the character described comprising a base provided with a transversely-extending groove or channel adapted to receive a conduit, substantially as described.

6. A device of the character described comprising a base having a transversely-extending groove provided with supplemental grooves or depressions in the walls of the main groove, adapted to receive corresponding projecting portions of a conduit, substantially as described.

7. A device of the character described comprising a base provided with a transversely-extending groove and with an opening in line with said groove, the groove being adapted to receive a conduit and said opening being adapted to permit the passage of wires from the conduit through the same, substantially as described.

8. A device of the character described comprising a base having a transversely-extending groove that opens through one face of the base and an opening in the opposite face of the base alined with said groove, the groove being adapted to receive a conduit.

9. The combination of a conduit having one side open and provided with a cover, with a base having a transversely-extending groove adapted to receive said conduit, substantially as described.

10. The combination of a conduit having its sides bent to form outwardly-projecting portions providing grooves, and a cover adapted to fit said grooves, with a base having a transversely-extending groove and supplemental grooves in the walls thereof adapted to receive the conduit and the outwardly-projecting portions thereof respectively, said base being provided with an opening in line with the main groove, substantially as described.

11. A device of the character described, comprising a base provided with a transversely-extending groove or channel to receive a conduit and having an opening for the passage of a wire, and also having abutments on opposite sides of said opening projecting toward the groove or channel, substantially as described.

GEO. A. LUTZ.

Witnesses:
T. F. BOURNE,
M. MANNING.